2,840,534
METHOD OF USING AMMONIUM ALUM IN DISCOLORATION REDUCTION OF FOAMED VINYL CHLORIDE POLYMERS

Lawrence Clark and Algirdas C. Poshkus, Lancaster, Pa., assignors to Armstrong Cork Company, Lancaster, Pa., a corporation of Pennsylvania No Drawing. Application January 30, 1956
Serial No. 562,020

6 Claims. (Cl. 260—2.5)

This invention relates generally to cellular products and more particularly to cellular products containing vinyl chloride polymer. Still more particularly, it relates to a method of reducing the discoloration normally encountered when a vinyl chloride polymer-containing composition is expanded by means of a blowing agent.

One of the major problems associated with the open mold expansion of vinyl chloride polymers such as polyvinyl chloride and vinyl chloride-vinyl acetate copolymer compositions is the discoloration and cellular breakdown in the central area of the large foamed masses. This discoloration and cellular break-down is apparently due to an overheating of the central area. It is believed that the overheating results from the exothermic decomposition of blowing agents such as diazoaminobenzene, oxy-bis-(p-benzene sulfonyl hydrazide), dinitroso pentamethylene tetramine, and many other blowing agents in common use.

Although the mechanism of the discoloration and cellular breakdown processes is not clear, it is postulated that at elevated temperatures the thermal energy becomes sufficient to break the primary valence bonds of high polymers. The polymer tends to split off hydrogen halide rather than depolymerize. Thus, most halogen-containing polymers give off hydrogen halide when heated.

The removal of an HCl molecule from the polymer chain of a vinyl chloride polymer will make the adjacent chlorine an allylic chloride which will be more reactive than a normal chloride. Thus, the initial removal of HCl tends to promote and accelerate stepwise removal of more HCl along the chain with the consequent formation of a polyene chain. Such polyene chains have been shown to be highly colored, and it is believed that this type of decomposition is responsible for the discoloration in the center of large foam masses.

Strong acids and bases catalyze the removal of HCl. Therefore, weak bases which neutralize the hydrochloric acid as it is split off have been used as vinyl stabilizers. In open mold expansion, however, these vinyl stabilizers have generally been detrimental to the cellular structure in those cases where they have been of aid in minimizing the discoloration.

These deleterious effects appear to be directly related to the internal temperature of the foam during blowing. Thus, an additive which has the ability to absorb heat without otherwise imparting undesirable properties to the finished foam would be desirable as a means of directly reducing the discoloration while preserving the necessary cellular structure.

It is the primary object of the present invention to supply such an additive. It is a further object of the present invention to supply an improvement in the art of foaming vinyl chloride polymer-containing compositions with a blowing agent whereby internal discoloration is materially reduced without imparting undesirable properties to the finished foam.

These objects have been achieved in a surprisingly effective and straight forward manner. A composition is formed comprising a vinyl chloride polymer and a blowing agent; additional ingredients such as plasticizers, fillers, antioxidants, and other ingredients normally used in the formation of vinyl foams may be added if desired. To this composition there is added an amount of ammonium alum effective to reduce discoloration in the foamed product. The composition is then heated to an elevated temperature sufficient to decompose the blowing agent in accordance with known technics. On cooling, the product will be found to possess little or no internal discoloration while at the same time possessing excellent cellular characteristics.

Typical examples of the vinyl chloride polymers which may be foamed or sponged in accordance with the method of this invention are polyvinyl chloride; vinyl chloride and vinyl acetate copolymers containing 95% vinyl chloride and 5% vinyl acetate; vinyl chloride and vinyl acetate copolymers containing 87% vinyl chloride and 13% vinyl acetate; vinyl chloride-vinyl acetate copolymers containing 91% vinyl chloride and 9% vinyl acetate; vinyl resin produced by polymerizing a mixture containing 86% vinyl chloride, 13% vinyl acetate, and 1% dicarboxylic acid; and vinyl chloride and other copolymerizable substances. It is also within the scope of this invention to sponge or foam blends of such polymers with other materials such as urea-formaldehyde resins, synthetic rubbers, for example butadiene-styrene copolymers, butadiene-acrylonitrile copolymers, and mixtures of synthetic rubbers and resins such as blends of butadiene-acrylonitrile copolymers and polyvinyl chloride.

Any of a number of plasticizing materials may be used in the polymeric composition. The plasticizers include such materials as plasticizing alkyd resins, phosphate plasticizers, for example triphenyl phosphate, tricresyl phosphate, and the like, phthalate plasticizers, for example dioctyl phthalate, diphenyl phthalate, and the like. Additionally, many polyesters in synthetic rubbers exert a plasticizing action on the vinyl chloride polymers, and these too may be used if desired. Fillers and stabilizers may be added, depending on the properties desired in the final foamed product.

The blowing agent to be used in the present invention is not critical. As mentioned earlier, such compounds as diazoaminobenzene, oxy-bis-(p-benzene sulfonyl hydrazide), dinitroso pentamethylene tetramine, and other organic and inorganic agents may be used in accordance with known methods.

To the above-described foamable compositions the present invention contemplates the addition of ammonium alum $(Al_2(NH_4)_2(SO_4)_4 \cdot 24H_2O)$. The ammonium alum is to be added in an amount of about 0.5–7% by weight of the total foamable composition, and preferably about 0.8%–3% by weight of the composition. Smaller amounts than the stated minimum, while beneficial, do not produce a practical reduction in discoloration. Larger amounts than the stated maximum, while substantially eliminating discoloration, cause changes in the normal cell structure of the final product which are deleterious for most uses. The ammonium alum may be added at any point during the preparation of the foamable composition which will insure complete and intimate dispersion of the ammonium alum throughout the foamable composition. Preferably the ammonium alum is added in the form of a very fine powder. Where a plasticizer is to be used, it is convenient to grind the ammonium alum and the plasticizer in a ball mill and then add the mix to the remainder of the composition.

In preparing a resin-rubber composition, a rubber such as a nitrile rubber may be banded on a cold mill and fluxed for several minutes. The vinyl chloride polymer resin, the plasticizer containing the ammonium alum, the blowing agent, and any other materials may be added either singly or as a mixture to the mill and milling continued without heating until the batch is uniformly mixed. The mill temperature may then be raised slowly until the resin and rubber fuse together. The sheets may be taken from the mill and foamed in that form, or they may be cooled and ground to form small particles or pellets and then foamed in that form.

Foaming is normally accomplished by simply heating the foamable composition to a temperature sufficient to decompose the blowing agent. Different blowing agents decompose at different temperatures, but this works no hardship since the blowing of vinyl compositions is fairly well understood by those skilled in the art. As a general rule, temperatures in the oven of about 280°–325° F. suffice to decompose most of the common blowing agents.

The peculiar effectiveness of ammonium alum in this application cannot be explained at present. Other compounds which might be thought to be effective do not have the merit of ammonium alum. Compounds such as the inorganic hydrates, amines, alkyl and earth metal citrates, picric acid, pentaerythritol tetranitrate, and polyhydric compounds such as starch and sucrose do not diminish discoloration to the extent that ammonium alum does. In fact, many of the compounds in those classes actually increase discoloration.

The following examples illustrate several embodiments of the invention. All parts by weight unless otherwise stated.

*Example I*

Three compositions, each containing the following ingredients in the stated amounts, were prepared:

| | Parts |
|---|---|
| Vinyl chloride—15% vinyl acetate (Bakelite's VYHH) | 400 |
| Butadiene-acrylonitrile copolymer (25% acrylonitrile) | 50 |
| Alkyd plasticizer (Paraplex G–60) | 40 |
| N,N'-dicarbethoxy - N,N'-dinitroso - 1,2-diaminoethane | 22.5 |

To each of the three above-described compositions there was added on the mill sufficient ammonium alum to yield a composition containing 0.8% 1.2%, and 1.4% by weight ammonium alum, respectively, based on the total composition weight.

The three compositions were pelletized, placed in containers, and heated in an oven maintained at 300° F. In each case a thermocouple was imbedded in the center of the foamable composition.

The internal temperature of the composition was measured as foaming proceeded. After 26 minutes in the oven, the compositions were removed and allowed to cool to room temperature.

When the foamed composition was cut open, it was found that the interior was substantially lighter than an identical composition foamed in the absence of ammonium alum. Additionally, the cellular structure of the three compositions containing the ammonium alum was excellent and possessed as good homogeneity as did the composition foamed in the absence of ammonium alum.

The thermocouple indicated that the internal temperature of the foam was maintained 8°–15° F. lower in the interior of the ammonium alum-containing compositions than was found in the control.

A similar run containing 2% ammonium alum gave just as good results with an internal temperature difference over the control of 10° F.

Similar runs containing 2% $CuSO_4 \cdot 5H_2O$, borax, barium citrate, calcium citrate, $Ni(NH_3)_6Cl_2$, $Ni(NH_3)_6SO_4$, $Na_3PO_4 \cdot 6H_2O$, $(NH_4)_2HPO_4$, $(NH_4)_2CO_3$, and hydroquinone monobenzyl ether, respectively, all yielded a foamed product more intensely discolored throughout the center than the control. Additionally, many of these compositions showed unusually large cell formation at the center.

*Example II*

The following base composition was made:

| | Parts |
|---|---|
| Polyvinyl chloride | 100 |
| Tricresyl phosphate | 100 |
| 2–V–4 cadmium stabilizer | 1 |
| Dibutyl tin dilaurate | 2 |
| N,N'-dimethyl, N,N'-dinitrose terephthalamide | 33 |

These ingredients were mixed at room temperature to a uniform consistency with a Sunbeam mixer. Various amounts of finely divided ammonium alum were then dispersed thoroughly in 30 part aliquots of the master batch by means of a mortar and pestle. The resulting uniform mixtures were poured into small molds, heated at 320° F. for 20 minutes, cooled, removed from the press and mold, and finally expanded in an air oven at 200° F. for 15 minutes. The cooled cellular products were examined visually for discoloration. Fine uniform texture and density were essentially the same for all samples; all samples appeared similar in every respect except for discoloration and small gas pockets.

In the following table the discoloration is assigned a number giving a value based on visual inspection relative to the control (almost a uniform gray-brown color) to which the arbitrary value of 10 was assigned. The natural white color of an undiscolored PVC foam would be one of this comparative scale.

| Percent Ammonium Alum | Discoloration (Relative) | Gas Pockets (No./cm.$^2$) | Density (lbs./cu. ft.) |
|---|---|---|---|
| None | 10 (Brown) | None | 3.1 |
| 2.9 | 9 (Pale brown) | 4 | 2.9 |
| 5.7 | 5 (Tan) | 10 | 2.7 |
| 13 | 2 (Pale brown core) | 15 | 3.2 |

We claim:

1. In the method of forming a cellular product by admixing a vinyl chloride polymer with a blowing agent and heating the mixture to a temperature in the range of about 280°–325° F. sufficient to decompose the blowing agent, the improvement which comprises incorporating in said mixture before heating an amount of ammonium alum in the range of about 0.5%–7% by weight based on the total composition, said amount being effective to reduce discoloration in said product.

2. The method according to claim 1 wherein said amount is in the range of about 0.8%–3%.

3. The method according to claim 1 wherein said vinyl chloride polymer comprises polyvinyl chloride.

4. The method according to claim 1 wherein said vinyl chloride polymer comprises a vinyl chloride-vinyl acetate copolymer containing up to about 13% by weight vinyl acetate.

5. In the method of forming a cellular product by admixing polyvinyl chloride with a blowing agent, a butadiene-acrylonitrile copolymer, and a plasticizer for said polyvinyl chloride, and heating the mixture to a temperature in the range of about 280°–325° F. sufficient to decompose said blowing agent, the improvement which comprises incorporating in said mixture before heating an amount of ammonium alum in the range of about 0.5%–7% by weight based on the total composition, said amount being effective to reduce discoloration in said product.

6. The method according to claim 5 wherein said amount lies in the range of about 0.8%–3%.

No references cited.

UNITED STATES PATENT OFFICE
CERTIFICATE OF CORRECTION

Patent No. 2,840,534                                   June 24, 1958

Lawrence Clark et al.

It is hereby certified that error appears in the printed specification of the above numbered patent requiring correction and that the said Letters Patent should read as corrected below.

Column 1, line 72, for "straight forward" read -- straightforward --; column 3, line 29, after "parts" insert -- are --; line 45, for "0.8%.1.2%," read -- 0.8%,1.2%, --; column 4, line 12, for "dinitrose" read -- dinitroso --; lines 34 and 35, Example II, second table therein, in the heading to the third column thereof, for $$(No./cm.^2)$$ read $$(No./cm^2)$$

Signed and sealed this 26th day of August 1958.

(SEAL)

Attest:

KARL H. AXLINE
Attesting Officer

ROBERT C. WATSON
Commissioner of Patents